(12) United States Patent
Küpper

(10) Patent No.: US 11,262,214 B2
(45) Date of Patent: Mar. 1, 2022

(54) METHOD FOR MONITORING AT LEAST TWO REDUNDANT SENSORS

(71) Applicant: Bayer Aktiengesellschaft, Leverkusen (DE)

(72) Inventor: Achim Küpper, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 791 days.

(21) Appl. No.: 16/062,033

(22) PCT Filed: Dec. 16, 2016

(86) PCT No.: PCT/EP2016/081406
§ 371 (c)(1),
(2) Date: Jun. 13, 2018

(87) PCT Pub. No.: WO2017/103093
PCT Pub. Date: Jun. 22, 2017

(65) Prior Publication Data
US 2018/0372506 A1    Dec. 27, 2018

(30) Foreign Application Priority Data

Dec. 18, 2015    (EP) .................................... 15200994

(51) Int. Cl.
*G01D 3/036*    (2006.01)
*G01D 3/08*    (2006.01)
(Continued)

(52) U.S. Cl.
CPC ........... *G01D 3/0365* (2013.01); *B64D 43/02* (2013.01); *G01D 3/08* (2013.01); *G01D 5/24461* (2013.01); *G05B 9/03* (2013.01); *B32B 2605/18* (2013.01)

(58) Field of Classification Search
CPC .... G01D 3/0365; G01D 3/08; G01D 5/24461; B64D 43/02; G05B 9/03; G05B 23/0254;
(Continued)

(56) References Cited

U.S. PATENT DOCUMENTS

2005/0210337 A1* 9/2005 Chester .............. G05B 23/0254
714/47.2
2013/0226327 A1    8/2013 Yang et al.

FOREIGN PATENT DOCUMENTS

DE    102 42 128 A1    3/2004
DE    10242128 A1 *    3/2004    ............... G01D 3/08
(Continued)

OTHER PUBLICATIONS

International Search Report of International Patent Application No. PCT/EP2016/081406 dated Feb. 28, 2017.

*Primary Examiner* — Regis J Betsch
*Assistant Examiner* — Kaleria Knox
(74) *Attorney, Agent, or Firm* — McBee Moore & Vanik, IP, LLC

(57) ABSTRACT

The invention relates to a method for monitoring at least two redundant sensors, which are in particular arranged in a chemical plant or an aircraft, comprising providing a first sensor signal of a first sensor, the first sensor signal comprising at least one measured value, providing at least one further sensor signal from a further sensor, the further sensor signal comprising at least one further measured value, generating a first analysis signal from the first sensor signal, generating at least one further analysis signal from the further sensor signal, determining at least one relationship between the first sensor signal and the further sensor signal at least in dependence on the first analysis signal and the further analysis signal over a time horizon, comparing the relationship with at least one admissible range, and, depend- (Continued)

ing on the result of the comparison, determining whether at least one sensor of the two redundant sensors is faulty.

8 Claims, 6 Drawing Sheets

(51) Int. Cl.
  *G01D 5/244* (2006.01)
  *B64D 43/02* (2006.01)
  *G05B 9/03* (2006.01)
(58) Field of Classification Search
  CPC G05B 23/0221; G05B 17/02; B32B 2605/18; G01M 3/22
  See application file for complete search history.

(56) References Cited

FOREIGN PATENT DOCUMENTS

| | | | |
|---|---|---|---|
| DE | 10 2004 044335 A1 | 4/2006 | |
| DE | 10 2011 113316 A1 | 3/2012 | |
| DE | 102011113316 A1 * | 3/2012 | ............... G01D 1/18 |
| DE | 10 2012 006629 A1 | 10/2012 | |
| WO | 84/00071 A1 | 1/1984 | |

* cited by examiner

METHOD FOR MONITORING AT LEAST TWO REDUNDANT SENSORS

CROSS-REFERENCE TO RELATED APPLICATIONS

This application is a National Stage entry of International Application No. PCT/EP2016/081406, filed 16 Dec. 2016, which claims priority to European Patent Application No. 15200994.0, filed 18 Dec. 2015.

BACKGROUND

Field

The invention relates to a method for monitoring at least two redundant sensors, which are in particular arranged in a chemical plant. The invention also comprises a monitoring device for monitoring at least two redundant sensors, e.g. in a chemical plant or in an aircraft.

Description of Related Art

There are many chemical plants in the chemical industry that have to meet strict safety requirements because of the substances that are processed in these plants. One chemical plant by way of example, but not the only one, is a toluene-2,4-diisocyanate (TDI) plant. For monitoring such a chemical plant, in particular as part of a protective safety function, or as part of an automatic check of important flying parameters of an aircraft by an autopilot, monitoring devices and sensors are used, in particular for the measuring of process variables, in order always to obtain current data on the at least one (chemical) process carried out in a plant. The current process data or process variables recorded by the sensors are usually transmitted to a monitoring device and evaluated by the latter. In an evaluation there may be specified, for example, an admissible range of values for the at least one recorded process variable. If the monitoring device finds that the value recorded by the sensor lies outside the admissible range of values, the process may be interrupted and/or an alarm output. An automatic control may also be carried out, in order to return the physical variable recorded by the sensor to a setpoint value. It can in this way be ensured for example that the emission from the chemical plant of a substance that is harmful to the environment is detected at the time and a further emission, and therefore harm, can be prevented.

A further application for redundant sensors that can be given by way of example is in aircraft. For example, the parameters that are important for a stable flying position are checked in an aircraft. Sensors are used for carrying out the checks, in order for example to record the flying speed. The flying parameters recorded are transmitted to the autopilot, which in the event of disturbances occurring takes controlling countermeasures in order to keep the flying position stable.

One problem with such monitoring is, however, that the checking itself may be faulty because of a faulty sensor. In other words, correct monitoring can only be ensured if the sensors used function faultlessly and deliver correct actual values, that is to say correct physical process variables. At this point, difficulties are encountered in particular in detecting a faulty sensor. A faulty sensor is generally only detected if the sensor signal delivered by the sensor or the measured values from this sensor signal lie(s) outside the aforementioned specified admissible range and the entire chemical plant is checked after being shut down and/or the aircraft is checked after landing. This however involves considerable loss of time, costs and effort. Even greater harm can occur, however, if the faulty sensor delivers an erroneous sensor signal that lies within the admissible range even though an actual process value lies in the inadmissible range. In other words, a malfunction, for example the escape of a harmful substance from a plant, remains undetected because of the faulty sensor.

In the case of the monitoring of an aircraft, a sensor may for example provide an erroneous measured speed value to the autopilot because of icing. It is then possible that the aircraft may crash. In the event that a faulty sensor is not detected, this may for example mean that an erroneous speed measurement suggests to the autopilot a sufficiently great flying speed even though in truth the aircraft is too slow and is about to stall, and consequently about to crash.

SUMMARY

The present invention is therefore based on the object of providing a method for monitoring sensors that makes reliable detection of a faulty sensor possible.

The object deduced and presented above is achieved according to a first aspect of the invention by a method according to Patent claim 1. The method is based on the use of at least two redundant sensors and the computer-implemented comparison of the measuring signals recorded by these sensors. The subject matter of the application is correspondingly a method for monitoring at least two redundant sensors that are in particular arranged in a chemical plant or in an aircraft, comprising the following steps:

a) providing a first sensor signal of a first sensor of the two redundant sensors, the first sensor signal comprising at least one measured value, b) providing at least one further sensor signal from a further sensor of the two redundant sensors, the further sensor signal comprising at least one measured value, c) generating at least one first analysis signal from the first sensor signal, d) generating at least one further analysis signal from the further sensor signal, e) selecting a horizon for the sensor signals from a), b) by comparison of the analysis signals from c) and d) with a predefined limit for the variance, stationarity and dynamics of the sensor signal, f) determining at least one correlation between the first analysis signal of the first sensor and the analysis signal of the further sensor or a difference between the first sensor signal of the first sensor and the sensor signal of the further sensor, g) comparing the correlation with at least one admissible correlation range or the difference with an admissible difference range, and h) depending on the result of the comparison according to g), determining whether at least one sensor of the two redundant sensors is faulty.

DETAILED DESCRIPTION OF A PREFERRED EMBODIMENT

The method according to the invention is typically carried out by a computer that is designed for carrying out the steps.

Because, by contrast with the prior art, the sensor signals of two redundant sensors are evaluated and at least in dependence on the two corresponding analysis signals at least one correlation or a difference between the sensor signals is derived, a faulty sensor can be reliably detected or attention can be drawn to incorrect behaviour of a sensor. The safety of the process being monitored can be increased. A faulty sensor can be replaced without great effort, and as a result with low costs. The sensor signals from three or more sensors can in turn be respectively evaluated in pairs.

Redundant sensors should be understood according to the invention as meaning that a first sensor is assigned at least one further (adjacent) sensor, which records in a measuring sense at least one similar, preferably the same, process variable. A first process variable is considered in the present case to be similar to a further process variable if, on account of the sequence of the process, the two process variables have a similar behaviour to one another, for example a similar dynamic change over time, or the first process variable can be converted into the further process variable (and vice versa) by a calculation.

In one embodiment, at least one sensor may be designed to record as a process variable a pressure, a mass flow, a temperature, a quality, such as a pH, a viscosity, a flow rate, a flying altitude etc.

Alternatively, however, it may also be a variable calculated from measured values. Preferably, the redundant sensors can measure the same process variable. It goes without saying that three or more redundant sensors may also be provided and be monitored, the comparison of the sensor signals, i.e. the ascertainment of the correlation or difference, according to step f) of the method then taking place in pairs.

From each of the at least two redundant sensors, at least one sensor signal is respectively provided. In particular, it may be provided that the first sensor delivers a first sensor signal to a monitoring device via a suitable communication link and the further sensor delivers a further sensor signal to the monitoring device via a suitable communication link. A sensor signal comprises for the purposes of the application a multiplicity of measured values, which are preferably recorded by the sensor (almost) continuously over a time interval (also referred to as an interval).

For the purposes of the application, a horizon for the testing of the sensors is defined by way of a time from the current point in time into the past or by way of a number of available measurements to the current measurement. Usually, a horizon is defined by way of a time (also known as a time horizon). For the purposes of the application, a horizon may be a moving horizon or a time interval.

It has been realized that, for a reliable evaluation or fault detection, first an analysis signal should be respectively determined, in particular calculated, from the at least two sensor signals provided. For the purposes of the application, an analysis signal is a signal that reproduces a measure of the variance, the stationarity or the dynamics of the data or measured values last recorded by the sensor.

It has been realized that, for a reliable determination of a faulty sensor, an analysis signal should have a sufficient number of measured values, while always comprising the most current measured values. This can be achieved by an analysis signal being produced over a moving horizon. So if there is a new measured value, allowance is made for this in the analysis signal and the oldest measured value is removed from the analysis signal.

It has additionally been realized that the definition or selection of the horizon is decisive for the quality of the testing. According to the invention, therefore, in step e) a selection of a horizon for the sensor signals from a), b) takes place by comparison of the analysis signal from c) and d) with a predefined limit for the variance, the stationarity and the dynamics of the sensor signal.

In order to determine at least one faulty sensor, a correlation between the at least two analysis signals or a difference between sensor signals from two redundant sensors are determined or ascertained over the horizon. It is also possible to establish a correlation directly (without calculation of analysis signals from the sensor signals) between the at least two sensor signals over the horizon, with the disadvantage that, if the correlation is small, the reliability of the method is lower. The at least one determined correlation or difference is then compared with a (specifiable) admissible correlation range or difference range. It goes without saying that, in particular in the case of a plurality of different correlations or differences, corresponding different admissible correlation ranges or difference ranges may be specified. An admissible correlation range may also be implicitly given by an explicitly stated admissible correlation range and/or at least one limit value. This also applies to a difference range.

For the detection or determination of a faulty sensor, the determined correlation or the difference is compared with an admissible correlation range or difference range. In the event that the correlation or the difference lies in the admissible range, there is no faulty sensor. In the event that the correlation of the difference does not lie in the admissible range, there is a faulty sensor. Then, for example, an alarm may be output. For example, measures for rectifying the fault, such as an exchange of the sensor, can then be initiated (including automatically). In order to avoid a false alarm, preferably the result of the comparison is verified in at least one checking step. For example, it may be provided that first a warning is output, and only if it is detected that the admissible correlation range or difference range is left a number of times (e.g. three times) is an alarm output.

It has been realized that various faults can occur. Faults, and consequently faulty sensors, by way of example, but not the only ones, that can be detected by embodiments according to the invention are offset faults, freezing faults and/or fouling faults. In the present case, an offset fault should be understood as meaning a constant inaccuracy of the measured values of one sensor in comparison with the measured values of the other sensor of the at least two redundant sensors. The constant deviation in the measured values between the redundant sensors may be interpreted as a stationary inaccuracy of a sensor. Freezing refers in the present case to the freezing of a sensor signal. In other words, the sensor signal concerned may always indicate a constant (erroneous) value, while the other sensor may (correctly) indicate the dynamic variation of the measured process variable. Fouling is understood in the present case as meaning in particular a time delay in the dynamic behaviour of the measuring signal of one sensor in relation to the measuring signal of the other sensor of the at least two redundant sensors. This may be caused for example by soiling of a sensor, such as an encrustation. The soiling may lead to a (dynamic) inertia of the sensor.

In a first embodiment of the method, a calculated standard deviation of the respective sensor signal in relation to a mean value over a moving horizon is used as the analysis signal. A standard deviation is a (good) measure of the variance, the stationarity and the dynamics of the measured data or of the measured values of the sensor signal.

In order in particular to detect an offset fault, in step e) of the method, the standard deviation of each sensor signal is used as the analysis signal. It is checked whether, for each sensor signal, the measure of the dynamics of the current measuring datapoint (in other words the analysis signal) over a horizon is sufficiently small, that is to say whether the process is stationary. The stationarity of the sensor signal is typically ascertained over a moving time horizon (also referred to as a moving horizon). If the standard deviation of the first sensor signal and the standard deviation of the further sensor signal respectively have an admissible or sufficient stationarity for the same period of time or points in time, that is to say for example do not exceed a corresponding limit value, the data or measured values are sufficiently stationary for an offset fault detection. Otherwise, there is the risk because of short-term dynamics, e.g. in the chemical process or in the speed of an aircraft, that a report of a de facto non-existent offset fault is given as a false alarm. A moving horizon of an analysis signal for offset checking is typically a few minutes. If the measuring datapoints of the two sensors respectively have only little dynamics over the moving horizon, after step f) of the method either the difference of the measuring signals (a series of measuring datapoints) or just the difference of the current measuring datapoints of the two sensors is calculated—also referred to as the offset value—and compared with a maximum offset limit value. Depending on the result of the comparison, it can be determined whether there is a faulty sensor. If the comparison shows that the determined difference does not lie in an admissible (specifiable) difference range or lies below a difference limit value, it can be deduced from this result of the comparison that there is an offset fault. In other words, depending on the result of the comparison, it can be determined in an easy and reliable way whether or not there is a faulty sensor.

In further embodiments, the method according to the invention typically comprises a freezing and/or fouling check with the following steps:

In steps c) and d) of these checks, the standard deviations and the first and/or second derivative of each sensor signal over time is generated/calculated as analysis signals of the respective sensor signal. In step e), a suitable horizon for the respective check is ascertained, typically a checking interval (also referred to as an interval) in which the recorded measuring datapoints of each sensor signal have dynamic behaviour. Datapoints with dynamic behaviour refer here to datapoints that are locally (in relation to the neighbouring datapoints) neither stationary nor characterized by a constant trend, i.e. a checking interval in which the gradient (first derivative) of the respective sensor signal over time varies sufficiently in the checking interval is ascertained. This is the case if the absolute value of the calculated second derivative of the respective sensor signal is sufficiently great (above a limit value). This is referred to hereinafter as dynamic behaviour. If, on the other hand, the sensor signal exhibits non-dynamic behaviour, new measuring datapoints are added to the checking interval under consideration, until it comprises a specified minimum number of dynamic measuring datapoints.

For the freezing check, then, in step f), the analysis signals from c) and d) are used for the check and a difference signal ($\Delta A$) is determined from the first analysis signal (A1) and the further analysis signal (A2). Preferably, in step f) the standard deviations of the sensor signals are respectively used as analysis signals. For the freezing check, however, it is also possible for the sensor signals to be used directly or their derivatives to be used as analysis signals. Then, a first crosscorrelation Cov(A1, $\Delta A$) between the determined difference signal and the first analysis signal is determined. A further crosscorrelation Cov(A2, $\Delta A$) between the determined difference signal and the further analysis signal is determined. Then, the ratio of the first crosscorrelation to the further crosscorrelation is determined. In step g), this ratio is compared with an admissible correlation range, in particular an admissible (specifiable) ratio range. If the crosscorrelations differ by orders of magnitude, i.e. the calculated ratio is outside a specified ratio range, there is freezing and the faulty sensor can be determined. If the absolute value of the crosscorrelation Cov(A1, $\Delta A$) is less than the other crosscorrelation Cov(A2, $\Delta A$), then sensor 1 is affected by freezing, and vice versa.

For a fouling check according to a particular embodiment of the method according to the invention, the determination of at least one correlation (step f) of the method) comprises maximizing the crosscorrelation between the first analysis signal and a further analysis signal by way of different time displacements ($\Delta T$). For this, typically the covariance Coy (A1, A2 ($\Delta T$)) between the first analysis signal and the further analysis signal over the checking interval is maximized by the time displacement A2($\Delta T$) of the further analysis signal. In other words, in step f) a delay time—also referred to as fouling time—is calculated as the correlation between the two sensor signals. The fouling tune is compared with an admissible delay time limit value. If the fouling time lies above a maximum admissible limit value, there is a faulty sensor. Preferably, in step f), the standard deviations of the sensor signals are respectively used as analysis signals. For the fouling check, it is also possible for the sensor signals to be used directly or their derivatives to be used as analysis signals.

The at least two sensors to be monitored are redundant sensors. These may for example be arranged in the direct vicinity of one another in a device of a chemical plant. For example, they may be directly adjacent to one another and/or comprise a common housing or the like. According to one embodiment, the redundant sensors may also be arranged at a distance from one another. For example, a first sensor may be located at the beginning of a fluid line and a further sensor at the end of a fluid line. In the case of another example, an apparatus may be arranged between the two sensors or the sensors may be arranged in different apparatuses arranged one after the other. This structural relationship between the first sensor and the second sensor may be determined according to a further embodiment. For example, this determination may take place (once) during the installation of the sensors. In a preprocessing step, at least one of the sensor signals provided may be processed on a time basis in a way dependent on the structural relationship of the sensors. In particular, in this way allowance can be made for (known) plant-related delays between the first sensor signal and the further sensor signal. This makes it possible to detect a faulty sensor of at least two redundant sensors even if the sensors are not directly adjacent but are arranged at a distance from one another.

According to a preferred embodiment, at least one of the sensor signals provided may be processed on a time basis in a way dependent on the structural relationship of the sensors by a first-order time delay element. In addition or as an alternative, at least one of the sensor signals provided may be processed on a time basis in a way dependent on the structural relationship of the sensors by a dead time element. In particular, it has been realized that process-engineering apparatuses that are arranged between two redundant sensors can be described by a first-order delay element (PT1) or a delay element of a higher order (PTn) or by a dead time element (PTt). If the dynamic behaviour of the process-engineering apparatus concerns a dead time element (PTt), the downstream measuring signal can be delayed by way of a time displacement.

In order to improve the quality of the data on which the fault detection is based, it may be provided according to a further embodiment that, before the determination of the first analysis signal and/or of the further analysis signal, at least one of the recorded sensor signals is (preprocessed) filtered in a filtering step, e.g. by a customary lowpass filter, in such a way that measuring noise is filtered out from the (corresponding) sensor signal. This filtering step may be omitted if the noise is normally distributed.

A further aspect of the invention is a monitoring device for monitoring at least two redundant sensors that are in particular arranged in a chemical plant. The monitoring device comprises at least one receiving device designed for receiving a first sensor signal of a first sensor of the two redundant sensors and for receiving at least one further sensor signal from a further sensor of the two redundant sensors. The first sensor signal comprises at least one measured value and the further sensor signal comprises at least one measured value. The monitoring device comprises at least one processing device designed for generating a first analysis signal from the first sensor signal and for generating at least one further analysis signal from the further sensor signal. The processing device is designed for determining at least one correlation between the first analysis signal of the first sensor and the analysis signal of the further sensor or a difference between the first sensor signal of the first sensor and the sensor signal of the further sensor. The monitoring device comprises at least one comparing device designed for comparing the correlation or difference with at least one admissible correlation or difference range or limit. The monitoring device comprises at least one evaluation device designed for determining whether, depending on the result of the comparison, at least one sensor is faulty.

The monitoring device is suitable in particular for carrying out the method described above.

Yet another aspect of the invention is a chemical plant comprising at least two redundant sensors and at least one monitoring device described above.

Yet another aspect of the invention is an aircraft comprising at least two redundant sensors and at least one monitoring device described above.

The features of the methods, devices and plants can be freely combined with one another. In particular, features of the description and/or of the dependent claims may be independently inventive on their own or when freely combined with one another, even while completely or partially circumventing features of the independent claims.

There are thus a multitude of possibilities for refining and further developing the monitoring device according to the invention, the method according to the invention and the chemical plant according to the invention. In this respect, reference should be made on the one hand to the patent claims arranged subordinate to the independent claims, on the other hand to the description of exemplary embodiments in conjunction with the drawing. In the drawing:

Hereinafter, the same designations are used for the same elements.

Figure 1:
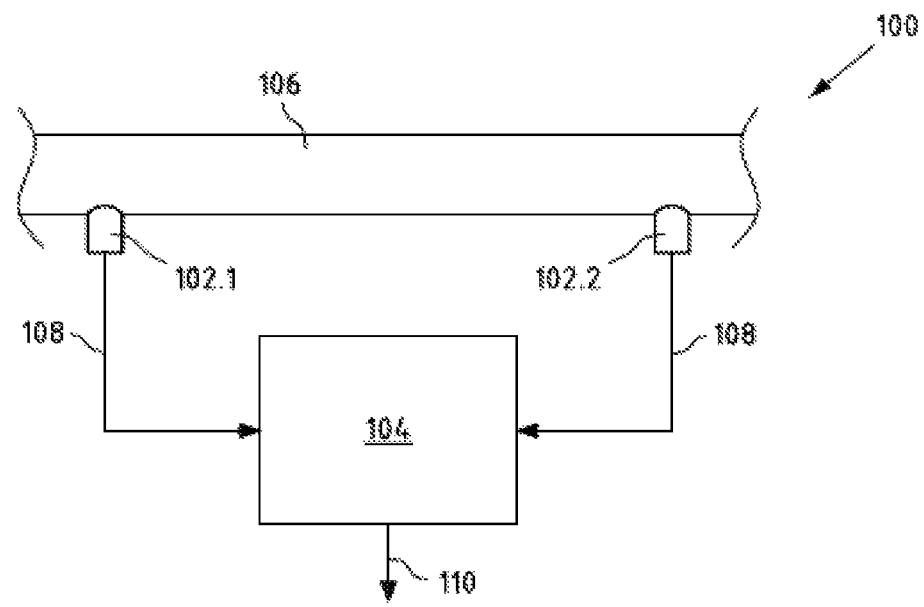
FIG. 1 shows a schematic partial view of an exemplary embodiment of a chemical plant according to the present invention.

FIG. 1 shows a schematic partial view of an exemplary embodiment of a chemical plant 100 according to the present invention. In particular, in the present exemplary embodiment part of a fluid line 106 of a chemical plant 100 is depicted. Through the fluid line 106 there flows a fluid, which can be monitored by redundant sensors 102.1, 102.2.

In the present case, two redundant sensors 102.1, 102.2 are arranged in the fluid line 106. In the present exemplary embodiment, the sensors 102.1, 102.2 are at a distance from one another. Allowance may be made for the structural relationship between the sensors 102.1, 102.2 in the detection of a faulty sensor 102.1, 102.2, as will be explained below. The sensors 102.1, 102.2 may however also be arranged directly next to one another. Furthermore, the redundant sensors 102.1, 102.2 may be designed for measuring at least one similar process variable. For example, the process variable may be the temperature of the fluid, the pressure within the fluid line 106, the flow rate, the pH of the fluid, etc.

The first sensor signal may be made available by the first sensor 102.1 to a monitoring device 104 via a communication link 108. A further sensor signal may be made available by the further sensor 102.2 via a communication link 108 of the monitoring device 104. Each sensor signal may be formed by a plurality of measured values. The monitoring device 104 is designed in particular to detect a faulty sensor 102.1, 102.2. When a faulty sensor 102.1, 102.2 is detected, corresponding information can be issued via an output 110 from the monitoring device 104.

The monitoring device 104 may be at least part of a computing device comprising processing means, storage means, etc.

Figure 2:
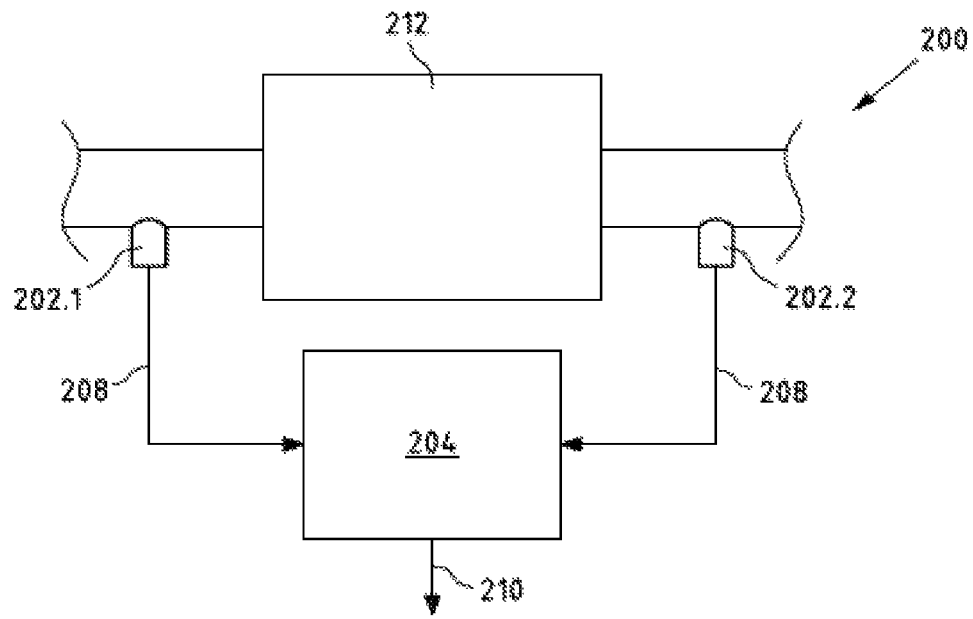
FIG. 2 shows a schematic partial view of a further exemplary embodiment of a chemical plant according to the present invention.

FIG. 2 shows a schematic partial view of a further exemplary embodiment of a chemical plant 200 according to the present invention. In comparison with the exemplary embodiment above, in this exemplary embodiment a chemical apparatus 212 is provided, arranged between the redundant sensors 202.1 and 202.2. The chemical apparatus 212 may be designed for processing a substance or a fluid. Allowance may also be made for the structural relationship between the redundant sensors 202.1 and 202.2 in a detection of a faulty sensor 202.1, 202.2. The respective sensor signals of the first and further sensors 202.1, 202.2 may be delivered to a monitoring device 204.

Figure 2A:
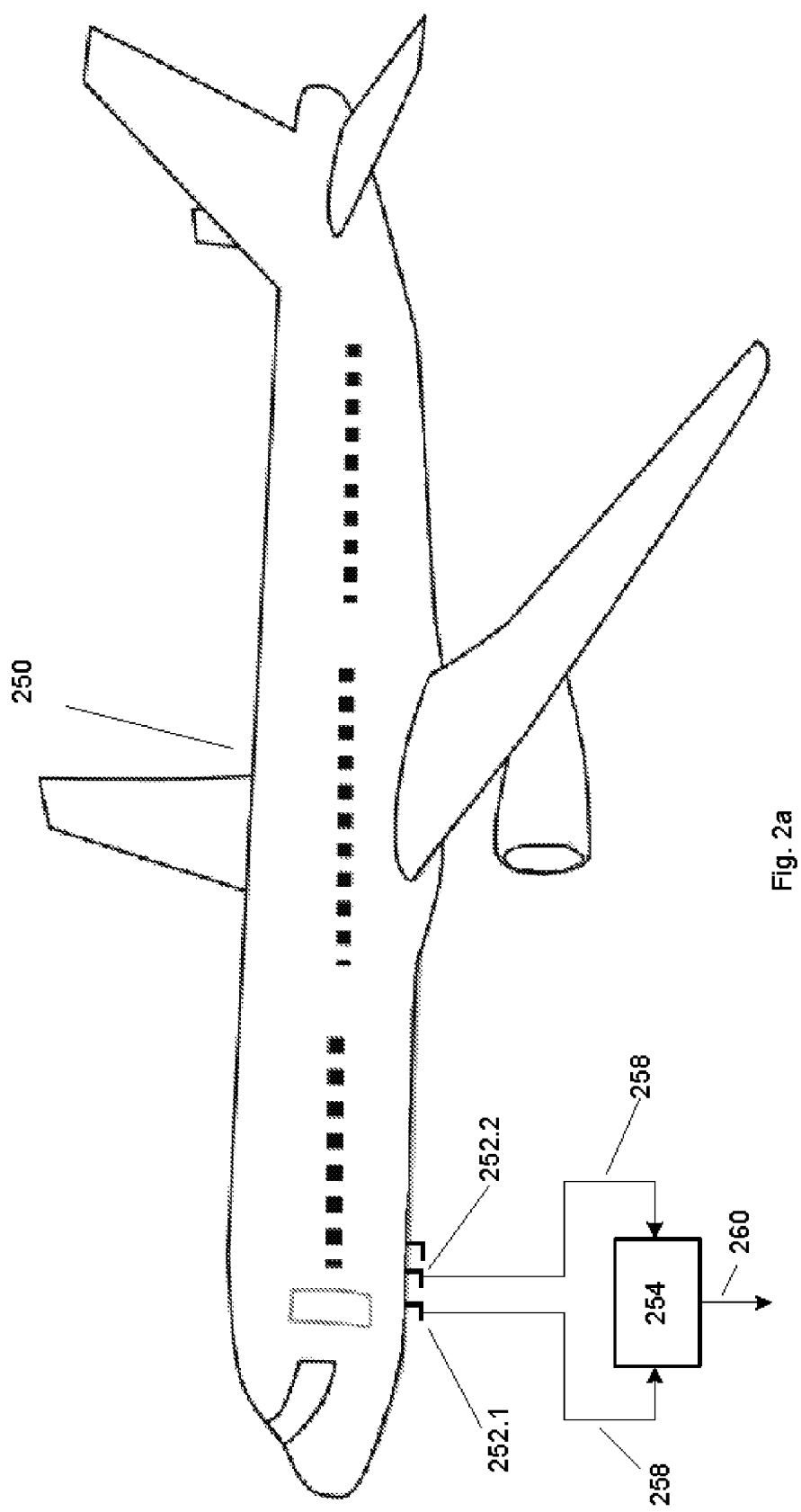
FIG. 2a shows a schematic partial view of an exemplary embodiment of an aircraft according to the present invention.

FIG. 2a shows a schematic partial view of an exemplary embodiment of an aircraft 250 according to the present invention. The speed of the aircraft is monitored in the present case by the sensors 252.1, 252.2. The first sensor signal may be made available by the first sensor 252.1 to a monitoring device 254 via a communication link 258. A further sensor signal may be made available by the further sensor 252.2 to the monitoring device 254 via a communication link 258. Each sensor signal may be formed by a plurality of measured values. The monitoring device 254 is designed in particular to detect a faulty sensor 252.1, 252.2. If a faulty sensor 252.1, 252.2 is detected, corresponding information can be issued via an output 260 from the monitoring device 254.

An exemplary embodiment of a monitoring device 104, 204, 254 is explained in more detail below.

Figure 3:
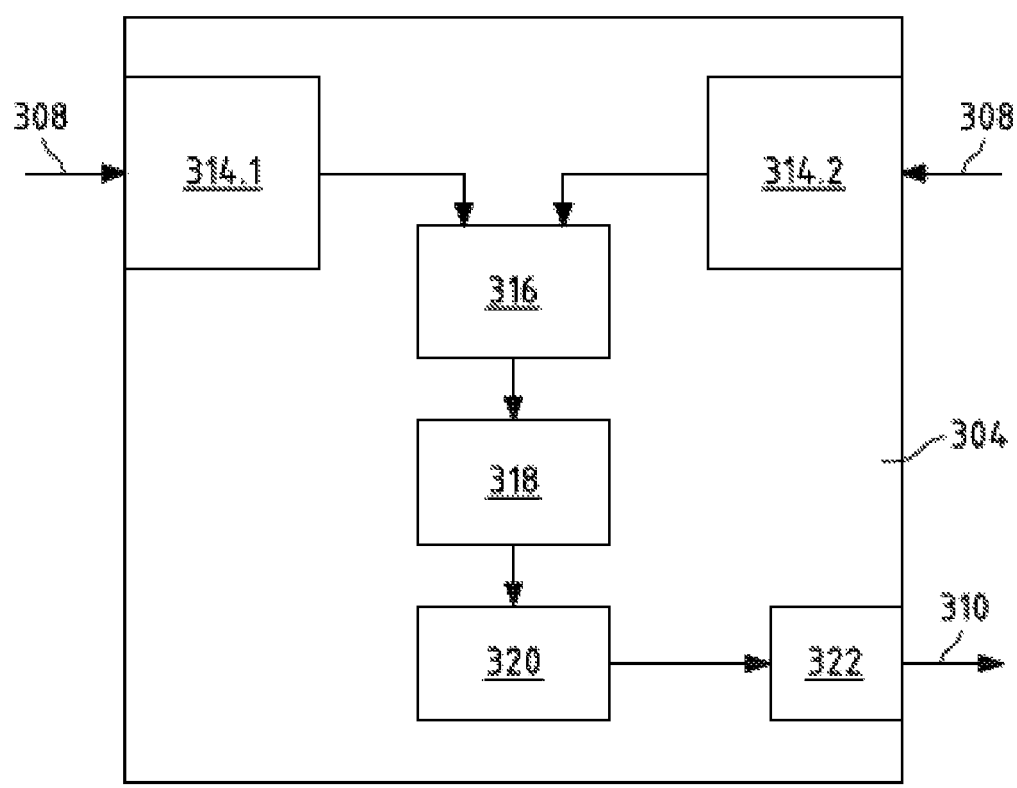
FIG. 3 shows a schematic view of an exemplary embodiment of a monitoring device according to the present invention.

FIG. 3 shows a schematic view of an exemplary embodiment of a monitoring device 304 according to the invention. As can be seen, the monitoring device 304 has in the present case a first receiving device 314.1 designed for receiving a first sensor signal and a further receiving device 314.2 designed for receiving a further sensor signal. It goes without saying that a common receiving device may also be provided.

In the present case, the two sensor signals are provided for a processing device 316. The processing device 316 is designed to generate a first analysis signal from the first sensor signal and to generate at least one further analysis signal from the further sensor signal. Furthermore, the processing device 316 is designed for determining at least one correlation between the first analysis signal of the first sensor and the analysis signal of the further sensor or a difference between the first sensor signal of the first sensor and the sensor signal of the further sensor.

The correlation or the difference may be made available to a comparing device 318, which is designed for the comparison with at least one admissible (specified) correlation or difference range or limit. The result of the comparison may be made available to an evaluation device 320. The evaluation device 320 is designed for determining whether at least one sensor is faulty. This determination takes place in a way dependent on the result of the comparison. If the evaluation device 320 finds that at least one of the monitoring sensors is operating faultily, it can pass this on to an output device 322, in order for example to give a warning and/or an alarm by way of an output 310.

Figure 4:
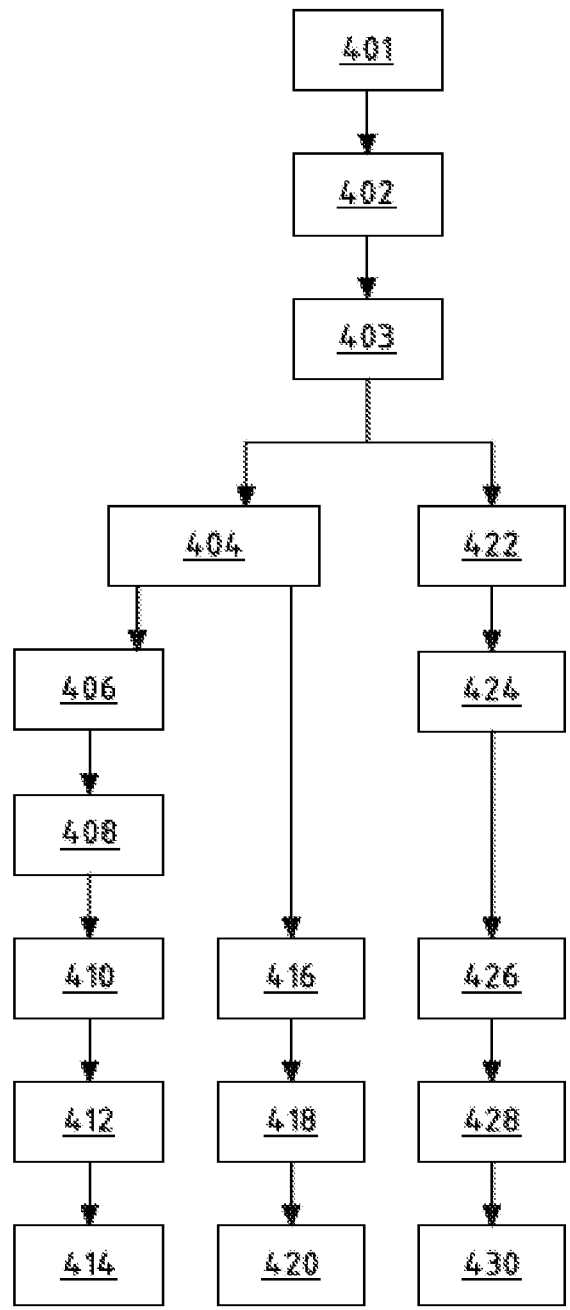
FIG. 4 shows a diagram of an exemplary embodiment of a method according to the present invention.

The monitoring device described above of the chemical plant or of the aircraft is described in more detail below with the aid of FIG. 4. FIG. 4 shows a diagram of an exemplary embodiment of a method according to the present invention. It should be noted for the following statements that the sensors are denoted by the index s and the measured value of a sensor is denoted by m.

In a first step 401, a sensor signal is respectively made available by the at least two redundant sensors. In particular, a monitoring device receives at least one first sensor signal of a first sensor and a further sensor signal of a further sensor. The further sensor forms a reference for the first sensor to be investigated.

Conversely, the first sensor is the reference for the further sensor. Consequently, it is always possible for at least two sensors to be investigated together as a pair of sensors. A detection of a fault may then concern this pair of sensors. The fault should be interpreted in particular as a relative fault. A detected fault may consequently be interpreted either as a positive fault for one sensor or as a negative fault for the other sensor.

In an optional next step 402, allowance may be made for structural relationships between the redundant sensors, in particular plant-related delays between the first sensor signal and the further sensor signal. A plant-related delay may for example result from the different measuring positioning of the first sensor, e.g. at a first end of a fluid line, and a further sensor, e.g. at the other end of the fluid line (cf. FIG. 1). A further example is that a first sensor is arranged upstream of a chemical apparatus and a further sensor is arranged downstream of the chemical apparatus (cf. FIG. 2).

Preferably, in step 402, the structural relationship for the then resultant dynamic behaviour may be (roughly) described by a first-order delay element (PT1) and/or by a dead time element (PTt). In the examples mentioned above, the upstream sensor may be delayed by the first-order delay element (PT1) or a delay element of a higher order (PTn) or by the dead time element (PTt), in order in particular to achieve the effect that the measurements of the two sensors are characterized by the same temporally adapted process dynamics. This allows a more reliable analysis of sensor behaviour.

With the aid of a volumetric flow measurement V between the two measuring positions, the time constant $T_{delay}$ can be calculated as a delay time between the two measuring positions of the first and further sensors.

$$T_{delay} = \frac{V}{\dot{V}}, \quad (1)$$

where V is the volume, assumed to be known, of a fluid line or the filling volume of the chemical apparatus or the like.

If the dynamic behaviour of the apparatus located between the measuring positions concerns a first-order delay element (PT1), the upstream measuring signal can be delayed in time in particular by way of a PT1 filter:

$$m(t_k) = \frac{T_{delay}}{T_{samp} + T_{delay}} m(t_{k-1}) + \frac{T_{delay}}{T_{samp} + T_{delay}} m_{orig}(t_k), \quad (2)$$

where $m_{orig}$ denotes the original measured value and $T_{samp}$ denotes the sampling time between the measured values or datapoints that are measured and $t_k$ denotes the current point in time.

Generally, the filtering of the measuring signal can be formulated as follows:

$$m(t_k) = \text{filter}(m(t_{k-1}), m_{orig}, T_{delay}, T_{samp} \quad (3)$$

If the dynamic behaviour of the apparatus located between the measuring positions concerns a dead time element (PTt), the downstream measuring signal can preferably be delayed by way of a time displacement $$m(t_k) = m_{orig}(t_k - T_{delay}) \quad (4)$$

where $m_{orig}$ is the original measured value.

It goes without saying that this step 402 may be omitted if there is no need to make allowance for structural relationships between the sensors, such as plant-related delays, because of a substantially identical measuring position.

In an optional step 403, sensor signals may be filtered to improve signal quality. For example, it may be envisaged to preprocess the first and/or the further sensor signal by way of a filter, such as a first-order filter PT1, in order to filter out measurement noise and/or short-term dynamic trends:

$$m_f(t_k) = \frac{T_{fil}}{T_{samp} + T_{fil}} m_f(t_{k-1}) + \frac{T_{fil}}{T_{samp} + T_{fil}} m(t_k), \quad (5)$$

where $m(t_k)$ is the measurement of the respective sensor at the point in time $t_k$, $m_f(t_k)$ is the filtered measurement, $T_{fil}$ is the filtering time, and $T_{samp}$ is the sampling time of the measurement (e.g. in the process control system or in the separate analysis computer).

Generally, the filtering of the measuring signal can be formulated as follows:

$$m_f(t_k) = \text{filter}(m_f(t_{k-1}), m(t_k), T_{fil}, T_{samp}). \quad (6)$$

Following the optional steps 402 and 403, in step 404 a first analysis signal, preferably a standard deviation, may be generated, in particular calculated, from the first sensor signal and a further analysis signal, preferably a standard deviation, may be generated, in particular calculated, from the further sensor signal. As already described, the sensor signals may have been preprocessed in steps 402 and 403. For example, in step 404, the standard deviation $x(t_k)$ or $\text{std}(t_k)$ of the filtered sensor signal may then be calculated over a moving horizon:

$$x(t_k) = \text{std}(t_k) = \sqrt{\frac{1}{n-1} \sum_{i=1}^{n} (m_f(t_{k-i+1}) - \overline{m}_f(t_k))^2}, \quad (7)$$

where $\overline{m}_f(t_K)$ is an average value, which can be calculated as follows:

$$\overline{m}_f(t_K) = \frac{1}{n} \sum_{i=1}^{n} m_f(t_{k-i+1}). \quad (8)$$

The moving horizon makes allowance in particular for the datapoints or measured values of the last n datapoints as from the present point in time. As the name already implies, the moving horizon moves as time passes, in particular in real time. If a new measured value is available, the last datapoint is dropped from the horizon; the remaining datapoints are displaced back by one time increment and the current datapoint with the new measured value is added. Generally, the calculation of the analysis signal ((7) and (8)) can be formulated as follows:

$$x(t_k) = \text{std}(t_k) = \text{std}(\text{filter}(m_f(t_k), \ldots, m_f(t_{k-n+1}))). \quad (9)$$

In step 404, it is possible in particular to generate analysis signals that are particularly suitable as a starting point for the detection of an offset fault and/or a freezing fault. In particular, it has been realized that an analysis signal with fewer data values is required for a reliable detection of an offset fault and/or a freezing fault than in the case of the detection of a fouling fault. For the subsequently described offset and freezing calculation, the analysis signal $x(t_k)$ can be evaluated over a relatively short horizon n. The monitoring of the sensors can therefore take place at the time of the occurrence of possible offset and freezing faults, while the monitoring of fouling faults may require a greater horizon, and fouling faults therefore can only be detected with a delay. For the offset calculation, it may in particular be sufficient if the process is stabilized for a short time. Also the freezing calculation on the basis of analysis signals with a relatively short horizon functions sufficiently robustly. For a robust fouling calculation, the long-term dynamic trends are more important, so that here a separate analysis signal $x(t_k)$ may be determined over a longer horizon n in a step 422, as will be described below.

In order to detect an offset fault, allowance for at least one plant-related process deviation may be made in an optional step 406. In particular, a correction value $\Delta_{correction}$ that makes allowance for the at least one plant-related process deviation may be determined. The correction value $\Delta m_{correction}$ may be required in particular whenever, for plant-related reasons, the process values of the measurement $m_2$ at the further sensor differ from the process values of the measurement $m_1$ at the upstream first sensor. The correction value may be known and in particular specified.

In a next optional step 408, it may be checked whether the analysis data (the analysis signals) are sufficiently steady for an offset check. Every chemical plant (continuously) undergoes dynamic changes, which may be caused e.g. by disturbances or changes in setpoint values. In other words, a chemical plant is not continuously operated in a stationary state. Even if the sensors are arranged adjacently, the sensors to be investigated are not located exactly at the same place in the chemical plant. This leads to a time delay, for plant-related reasons, between the physical variables that are recorded by the two sensors. These short-term dynamic changes, for example because of disturbances or changes in setpoint values, cannot be predicted in advance, and therefore also cannot be filtered out in a way corresponding to step 402 or in a similar way. Nevertheless, allowance should be made for them in the offset detection in order to prevent false detections. In other words, the aim is not to interpret the occurrence of dynamic changes that lead to physical values deviating from one another for a short time at the positions of the redundant sensors as an offset between the two sensors. For a particularly reliable offset fault detection, it is therefore preferred to check in step 408 whether the first and further analysis signals are sufficiently stationary, i.e. that the dynamic changes in the plant are relatively small.

As already described, an analysis signal in the form of a standard deviation is a measure of the variance of the data or a measure of the stationarity of the data, that is to say of the corresponding sensor signal. In order to ensure that only sufficiently stationary analysis signals are used in the further determination of an offset fault, the first analysis signal $x_1(t_k)$ and the further analysis signal $x_2(t_k)$ may be compared with at least one (specified) limit value $\text{std}_{lim}$. The following comparison may be carried out in step 408:

$$x_1(t_k) < \text{std}_{lim}$$

$$x_2(t_k) < \text{std}_{lim} \quad (10)$$

If the result of the comparison from (10) is positive, then it is possible to continue with step 410. In particular, the difference (=mean deviation $\Delta m$) between the sensor signals can then be determined in dependence on the analysis signals. In the case of a negative result of the comparison from (10), the procedure may be interrupted, in particular for as long as it takes for the check to produce a sufficiently positive outcome.

In step 410, the mean deviation $\Delta m$, in particular the absolute value of the mean deviation $\Delta m$, of the measured values m of the sensor signals may be determined. In this case, allowance can be made for the correction value $\Delta m_{correction}$ determined in step 406. Preferably, the following calculation can be carried out by the processing device in step 412:

$$\Delta m = |m_{f,2}(t_k) - m_{f,1}(t_k) + \Delta m_{correction}|. \quad (11)$$

In step 412, the comparing device may compare the mean deviation $\Delta m$, in particular the absolute value of the mean deviation $\Delta m$, determined in step 410 with an admissible deviation. Preferably, the deviation $\Delta m$ may be scaled in advance to the measuring range of the sensor. The following comparing operations can be carried out:

$$\left|\frac{\Delta m}{measur.\text{range}}\right| < \text{off}_{lim}. \tag{12}$$

In particular, it is checked according to (12) whether the mean deviation Δm lies within an admissible range, that is to say does not exceed a (specified) limit value off$_{lim}$. Depending on the result of the comparison, it is determined in particular by the evaluating device whether there is a faulty sensor. If the limit value off$_{lim}$ is exceeded, i.e. the deviation between the sensor signals therefore lies in an inadmissible range, one of the two redundant sensors has a fault, in particular an offset fault.

In the next step 414, in the case of such a result of the comparison, a warning and/or an alarm may be output. For example, it may be provided that, to avoid a false alarm, first only a warning is output. If this warning is repeated over repeat$_{offset}$ successive sampling increments (where the process should continue to be stationary over the respective sampling increments (10)), an alarm concerning the incorrect behaviour of the pair of sensors may take place.

Figure 5:
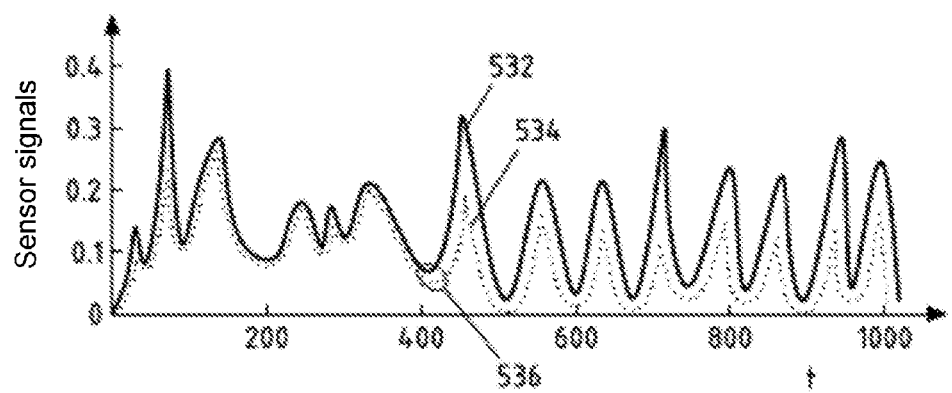
FIG. 5 shows a diagram given by way of example with variations of sensor signals.

FIG. 5 shows a diagram with a variation of a first sensor signal 532 and of a further sensor signal 534 given by way of example. The designation 536 identifies the point in time from which an offset fault occurs. It goes without saying that the variations shown are schematic variations.

As already described, it may in addition or as an alternative be provided that a freezing fault of a sensor is detected by the method in that, depending on the analysis signals generated in step 404, a correlation is determined as set out below. In particular, the freezing calculation may be performed by way of an evaluation of the crosscorrelations of the two analysis signals.

In step 416, a difference signal Δx may be determined from the first analysis signal $x_1(t_k)$ and the further analysis signal $x_2(t_k)$:

$$\Delta x = x_2(t_k) - x_1(t_k) \tag{13}$$

As already described, freezing should be understood in the present case as meaning that the sensor signal from a sensor has frozen at a constant value, and consequently its standard deviation, that is to say the analysis signal, becomes zero.

Then, in step 416, crosscorrelations between the difference signal Δx and the analysis signal $x_1(t_k)$ from the first sensor and the difference signal Δx and the analysis signal $x_2(t_k)$ from the further sensor may be analysed. For the analysis, the respective analysis signal (9) may for example be collected over an interval p with the length $n_{freeze}$ (e.g. 1000 measured values). When the interval p is filled with datapoints of the analysis signal, the crosscorrelations between the difference signal Δx and the analysis signal $x_1(t_k)$ are calculated. This corresponds to the covariance $cov_{x1,\Delta x,p}$ between the analysis signal $x_{1,p}$ and the difference signal Δx p:

$$cov_{x1,\Delta x,p} = cov(x_{1,p}, \Delta x_p). \tag{14}$$

The crosscorrelations between the difference signal Δx and the analysis signal $x_2(t_k)$ can be calculated in a corresponding way. This corresponds to the covariance $cov_{x2,\Delta x,p}$ between the analysis signal $x_{2,p}$ and the difference signal $\Delta x_p$:

$$cov_{x2,\Delta x,p} = cov(x_{2,p}, \Delta x_p). \tag{15}$$

A detailed possible way of determining the covariance is described below. The covariance between the difference signal Δx and the analysis signal $x_1(t_k)$ can be calculated as follows:

$$cov_{x1,\Delta x,p} = \frac{1}{n_{freeze}-1} \sum_{i=1}^{n_{freeze}} (x_1(t_{k-i+1}) - \overline{x}_{1,p}) * (\Delta x(t_{t-i+1}) - \overline{x}_p). \tag{16}$$

The crosscorrelations between the difference signal Δx and the analysis signal $x_2(t_k)$ can be calculated correspondingly:

$$cov_{x2,\Delta x,p} = \frac{1}{n_{freeze}-1} \sum_{i=1}^{n_{freeze}} (x_2(t_{k-i+1}) - \overline{x}_{2,p}) * (\Delta x(t_{t-i+1}) - \overline{x}_p). \tag{17}$$

For the calculations, the average value $\overline{x}_{1,p}$ of the first analysis signal $x_1(t_k)$ $$\overline{x}_{1,p} = \frac{1}{n_{freeze}} \sum_{i=1}^{n_{freeze}} x_1(t_{k-i+1}) \tag{18}$$

the average value $\overline{x}_{2,p}$ of the further analysis signal $x_2(t_k)$ $$\overline{x}_{2,p} = \frac{1}{n_{freeze}} \sum_{i=1}^{n_{freeze}} x_2(t_{k-i+1}) \tag{19}$$

and the average value $\overline{x}_p$ of the difference signal Δx $$\overline{x}_p = \frac{1}{n_{freeze}} \sum_{i=1}^{n_{freeze}} \Delta x(t_{k-i+1}) \tag{20}$$

are calculated. This calculation may be carried out as soon as the current interval is filled with $n_{freeze}$ data or measured values. When the interval and the freezing calculation have been completed, the current data (of the current point in time) can be collected for the next interval until there are again $n_{freeze}$ data.

Subsequently, in step 416, the ratio of the two crosscorrelations $cov_{x1,\Delta x,p}$ and $cov_{x2,\Delta x,p}$ is determined as a correlation. The ratio may be compared in a comparing step 418 with an admissible (specified) ratio range. For example, a limit value ratio$_{freezing,tol}$ (e.g. ratio$_{freezing,tol}$=1000) may be specified. If the ratio lies within the admissible ratio range, there is no fault. Otherwise, it can be deduced that there is a faulty sensor. If there is a fault, it is possible in particular for the defective sensor to be identified as follows. If $$\left|\frac{cov_{x1,\Delta x,p}}{cov_{x2,\Delta x,p}}\right| > \text{ratio}_{freezing,tol} \tag{21}$$

then the ratio lies in a further inadmissible sub-range. The further sensor is defective (frozen). If $$\left|\frac{\text{cov}_{x2,\Delta x,p}}{\text{cov}_{x1,\Delta x,p}}\right| > \text{ratio}_{freezing,tol} \qquad (21)$$

then the ratio lies in a first inadmissible sub-range. The first sensor is defective (frozen).

In these cases, a warning and/or an alarm may be output in step 420. For example, it may be provided that, to avoid a false alarm, first only a warning is output. In particular, if (21) or (22) is satisfied, a warning for the respective sensor may be output. If this warning is repeated over (specifiable) repeat$_{freezing}$ successive intervals, an alarm concerning the incorrect behaviour of the identified sensor may take place.

Figure 6:
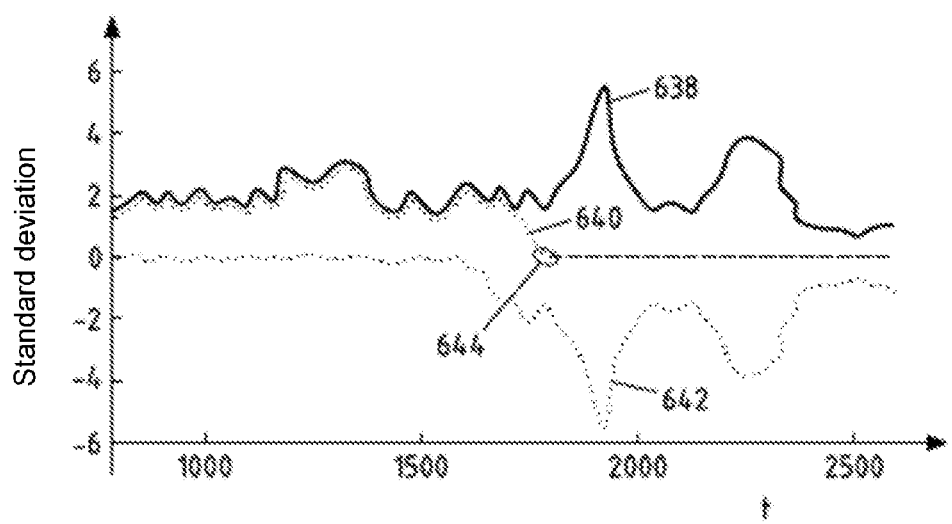
FIG. 6 shows a further diagram given by way of example with variations of analysis signals.

FIG. 6 shows a diagram of a first analysis signal 638 given by way of example, a further analysis signal 640 given by way of example and a difference signal 642 resulting from these signals 638, 640. The designation 644 represents the point in time from which the further sensor is frozen; the resultant analysis signal therefore gives 0. As can be seen, the analysis signal of the further signal correlates with the difference signal of the analysis signals. From this it can be deduced that the first sensor is frozen. It goes without saying that the variations shown are schematic variations.

As already described, it may in addition or as an alternative be provided that a fouling fault of a sensor is detected by the method. The detection of a fouling fault may likewise be performed by way of an evaluation of the crosscorrelations of the two analysis signals. It may be based on a maximization of the covariance between the analysis signals. The analysis signals described above of the two redundant sensors may be stored over an interval q with a length ($n_{fouling}+2*z_{max}$). In particular, the interval q has been extended by the data $2*z_{max}$. In the present case, $2*z_{max}$ represents the search domain of the fouling calculation presented below. In the present case, $n_{fouling}$ represents the length of the actual core of the interval q. The fouling analysis may be carried out as soon as the interval q is filled with data. It is important for the fouling calculation that there is a meaningful set of data in the interval q, characterized by sufficient dynamics in the data. Therefore, the core of the interval $n_{fouling}$ must be chosen to be sufficiently long, so that time intervals in which the process is running in a stationary state can be bridged. The length $n_{fouling}$ of the core of the interval may be chosen to be constant. Alternatively, the length $n_{fouling}$ may also be kept variable. The length may be calculated here by way of an optional calculation that can be carried out in step 424 in such a way that the data are excited by sufficient dynamics in order to make an even more reliable fouling fault detection possible.

In particular, after generating a first analysis signal and a further analysis signal, in step 422 the following determination may be carried out:

The aim of the determination is in particular that in both the analysis signals there are respectively datapoints with sufficient dynamics in the interval. A dynamic measuring datapoint is characterized here by dynamic behaviour in comparison with its neighbouring measuring datapoints, i.e. that the first derivative with respect to time at the datapoint considered is not constant, the process value or measured value therefore does not rise (or fall) with a constant slope or is stationary. The second derivative is a measure that the first derivative with respect to time at the datapoint considered is constant.

The determination in step 424 for calculating the interval length investigates in particular the second derivative of a datapoint or measured value with respect to time. This involves using the signal of the filtered measured value $m_{f,k}$ (6).

For the datapoint $m_{f,k}$ at the point in time $t_k$, it is possible to calculate the second derivative $\Delta^2 m_{f,k}$ with the sampling time $T_{samp}$ with the aid of the neighbouring datapoints $m_{f,k-1}$ at the point in time $t_{k-1}$, and $m_{f,k-2}$ at the point in time $t_{k-2}$:

$$\Delta^2 m_{f,k} = \frac{m_{f,k} - 2m_{f,k-1} + m_{f,k-2}}{T_{samp}^2}. \qquad (23)$$

Datapoints that satisfy the condition for non-dynamic behaviour, e.g.:

$$|\Delta^2 m_{f,k}| < \varepsilon_{dyn} \qquad (24)$$

can be collected in the dataset $n_{fouling,non-dyn}.\varepsilon_{dyn}$ is a small positive (specifiable) tolerance, which in the present case serves as a measure of dynamic behaviour.

$$n_{fouling,non-dyn}|(|\Delta^2 m_{f,k}|) < \varepsilon_{dyn} \qquad (25)$$

The $n_{fouling,non-dyn}$ datapoints in the interval q are not particularly suitable for fouling detection. The data that are sufficiently dynamic, that is to say do not satisfy condition (24), are collected in the dataset $n_{fouling,dyn}$:

$$n_{fouling,dyn}|(|\Delta^2 m_{f,k}| \geq \in_{dyn}). \qquad (26)$$

If non-dynamic datapoints are detected in an interval q, the length $n_{fouling}$ of the core of the interval q may be increased in such a way that the (specified) dynamic condition that at least $n_{fouling,dyn,min}$ dynamic datapoints are contained in the interval q for at least one sensor is satisfied. Preferably, the dynamic condition is demanded for both sensors, as set out in formula (27).

$$n_{fouling} > \max^*(n_{fouling,non-dyn,s} + n_{fouling,dyn,min}). \qquad (27)$$

The index s stands here for the first sensor or the further sensor. In other words, there must preferably be sufficient dynamic datapoints or measured values for both sensors in the interval q.

In step 426, the crosscorrelation between the two sensors can then be maximized by the processing device, in that the first analysis signal from the first sensor is displaced in comparison with the further analysis signal of the further sensor in such a way that the two analysis signals are made to coincide.

In particular, the maximization of the crosscorrelation can be achieved by the covariance between the first analysis signal and the further analysis signal over the interval q being maximized on the basis of the displacement of the further analysis signal. The displacement of the further analysis signal may be performed by way of z time increments in the negative or positive direction. The covariance $\text{cov}_q$ in the interval q can be maximized as a degree of freedom with the aid of z, where z is the number of time increments by which the further analysis signal is displaced. The displacement z may be restricted by $[-z_{max}, z_{max}]$. In the interval q, the covariance $\text{cov}_q$ is calculated with the aid of the analysis signals:

$$\max_z \text{cov}_q \qquad (28)$$

$$\text{s.t. } \text{cov}_q = \text{cov}(x_1(t_{k-z_{max}}), \ldots, x_1(t_{k-n_{fouling}+1-z_{max}}),$$

$$x_2(t_{k-z_{max}+z}), \ldots x_2(t_{k-n_{fouling}+1-z_{max}+z}))$$

-continued $$z \in [-z_{max}, z_{max}].$$

In particular, the maximization for the first analysis signal $x_1$ and the further analysis signal may take place as follows:

$$\max_z \text{cov}_q \tag{29}$$

$$\text{s.t. cov}_q = \frac{1}{n_{fouling} - 1} \sum_{i=1}^{n_{fouling}} (x_1(t_{k-i+1-z_{max}}) - \overline{x}_{1,q}) * (x_2(t_{k-i+1-z_{max}+z}) - \overline{x}_{2,q})$$

$z \in [-z_{max}, z_{max}]$, where $$\overline{x}_{1,q} = \frac{1}{n_{fouling}} \sum_{i=1}^{n_{fouling}} x_1(t_{k-i+1-z_{max}}) \text{ and} \tag{30}$$

$$\overline{x}_{2,q} = \frac{1}{n_{fouling}} \sum_{i=1}^{n_{fouling}} x_2(t_{k-i+1-z_{max}+z}). \tag{31}$$

The fouling time r may be determined as a correlation condition from the performed displacement z, that is to say the number z of datapoints by which the further analysis signal $x_2$ has been displaced, and the sampling time $T_{sample}$. For example, the fouling time r may be calculated as follows:

$$\tau = T_{sample} * z. \tag{32}$$

In a comparing step 428, this correlation condition may be compared with an admissible fouling time range.

$$|\tau| > \tau_{warn} \tag{33}$$

Depending on the result of the comparison, it is determined whether there is a faulty sensor. If the limit value $\tau_{warn}$ is exceeded, the correlation condition therefore lies in an inadmissible range, one of the two redundant sensors has a fault, in particular a fouling fault.

In the next step 430, a warning and/or an alarm may be output. For example, it may be provided that, to avoid a false alarm, first only a warning is output. If this warning is repeated over (specifiable) $\text{repeat}_{fouling}$ successive intervals, an alarm concerning the incorrect behaviour of the pair of sensors may take place.

Figure 7:
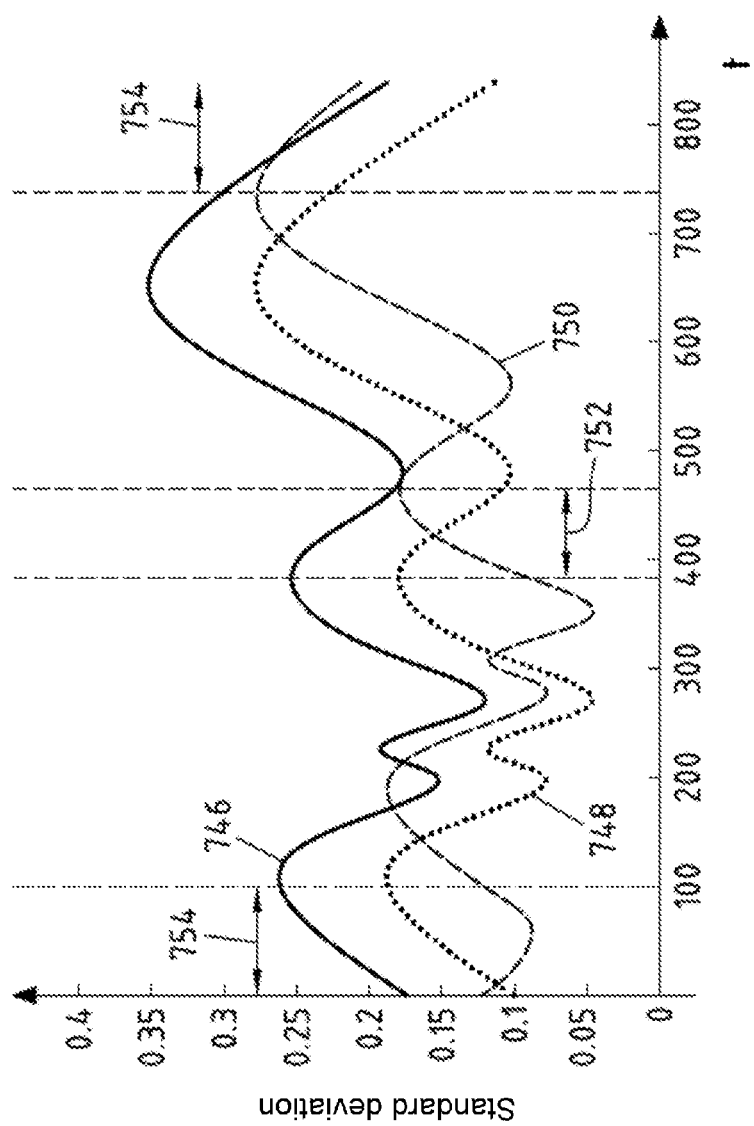
FIG. 7 shows a further diagram given by way of example with variations of analysis signals.

FIG. 7 shows a diagram given by way of example with a first analysis signal 746, a further analysis signal 750 and the analysis signal 748 displaced by 752. Here, 752 is the time constant resulting from the calculation, which is referred to as the fouling time. It goes without saying that the variations shown are schematic variations. The designation 754 denotes the search domain.

The invention claimed is:

1. Computer-implemented method for monitoring at least two redundant sensors arranged in a chemical plant, comprising:
   a) providing at least two redundant sensors,
   b) providing a first sensor signal of a first sensor of the at least two redundant sensors, the first sensor signal comprising at least one measured value,
   c) providing at least one further sensor signal from a further sensor of the at least two redundant sensors, the further sensor signal comprising at least one further measured value,
   d) generating at least one first analysis signal from the first sensor signal,
   e) generating at least one further analysis signal from the further sensor signal,
   f) selecting a time horizon for the sensor signals from b), c) by comparison of the analysis signals from d) and e) with predefined limits for the variance, stationarity and/or dynamics of the sensor signal,
   g) determining at least one correlation between the first analysis signal of the first sensor and the analysis signal of the further sensor,
   h) comparing the correlation with at least one admissible correlation range or the difference with an admissible difference range, and
   i) depending on the result of the comparison according to h), determining whether at least one sensor of the two redundant sensors is faulty,
   j) issuing the determination according to i);
   wherein
   in d), a second derivative of the first sensor signal is generated, and
   in e), a second derivative of the further sensor signal is generated, and
   in f), a horizon in which there are a minimum number of datapoints is ascertained, comprising a second time derivative, the absolute value of which lies above a specified dynamics limit value of the second derivative.

2. Method according to claim 1, wherein
   in d), a standard deviation of the first sensor signal is additionally generated, and
   in e), a standard deviation of the further sensor signal is additionally generated, and
   in g), a difference signal is determined from the standard deviation of the first sensor signal and the standard deviation of the further sensor signal, then
   a first cross-correlation between the determined difference signal and the standard deviation of the first sensor signal is determined, and
   a further cross-correlation between the determined difference signal and the standard deviation of the further sensor signal is determined,
   the ratio of the first cross-correlation and the further cross-correlation is determined, and
   in h) the determined ratio is compared with an admissible ratio range.

3. Method according to claim 2, wherein, if the calculated ratio lies outside the admissible ratio range, the faulty sensor is the sensor with the smaller absolute value of the cross-correlation and a corresponding notification is issued.

4. Method according to claim 1, wherein
   a Spatial distance between the first sensor and the further sensor is determined, and -depending on a volumetric flow measurement and on the spatial distance between the sensors, at least one of the sensor signals provided is processed on a time basis.

5. Method according to claim 4, wherein
   depending on the spatial distance between the first sensor and the further sensor, one of the sensor signals provided is processed on a time basis by a delay element of at least the first order, and/or
   depending on the volumetric flow measurement and on the spatial distance between the sensor and the further sensor, one of the sensor signals provided is processed on a time basis by a dead time element.

6. Method according to claim 1, wherein, before determination of the first analysis signal and/or of the further analysis signal, at least one of the recorded sensor signals is filtered in a filtering step in such a way that at least measuring noise is filtered out from the sensor signal.

7. A monitoring device for performing the method of monitoring at least two redundant sensors arranged in a chemical plant according to claim 1, comprising:
- at least one receiving device designed for receiving the first sensor signal of the first sensor of the two redundant sensors and for receiving at least one further sensor signal from the further sensor of the two redundant sensors,
- the first sensor signal comprising the at least one measured value and the further sensor signal comprising at least one measured value,
- at least one processing device designed for generating said a first analysis signal from the first sensor signal and for generating said at least one further analysis signal from the further sensor signal,
- the processing device being designed for determining at least one correlation condition between the first sensor signal and the further sensor signal at least in dependence on the first analysis signal and the further analysis signal, wherein the at least one correlation condition comprises selecting said time horizon for the sensor signals by comparison of the analysis signals with said predefined limits for the variance, stationarity, and/or dynamics of the sensor signal, and determining at least one correlation between the first analysis signal of the first sensor and the analysis signal of the further sensor,
- at least one comparing device designed for comparing the correlation condition with the at least one admissible correlation range, and
- at least one evaluation device designed for determining whether, depending on the result of the comparison, at least one sensor is faulty.

8. Chemical plant, comprising:
at least one monitoring device according to claim 7.

* * * * *